United States Patent [19]

Eriksson

[11] Patent Number: 4,594,236
[45] Date of Patent: Jun. 10, 1986

[54] METHOD OF MANUFACTURING CALCIUM CARBIDE FROM POWDERED LIME AND/OR LIMESTONE

[75] Inventor: Sune Eriksson, Hofors, Sweden

[73] Assignee: SKF Steel Engineering AB, Hofors, Sweden

[21] Appl. No.: 526,411

[22] Filed: Aug. 25, 1983

[30] Foreign Application Priority Data

Sep. 7, 1982 [SE] Sweden ............................ 8205071

[51] Int. Cl.$^4$ ........................................... C01B 31/32
[52] U.S. Cl. .................................. 423/441; 423/442; 204/164
[58] Field of Search ............... 423/441, 442, DIG. 10; 204/164

[56] References Cited

U.S. PATENT DOCUMENTS

| | | | |
|---|---|---|---|
| 2,823,983 | 2/1958 | Udy | 423/442 |
| 2,996,360 | 8/1961 | Kuhlmann | 423/442 |
| 3,017,259 | 1/1962 | Eastman | 423/441 |
| 3,257,196 | 6/1966 | Foex | 422/209 X |
| 4,221,762 | 9/1980 | Andrjushin et al. | 423/442 |
| 4,439,410 | 3/1984 | Santén et al. | 423/350 |

FOREIGN PATENT DOCUMENTS 149854  8/1981  German Democratic Rep. .................................. 423/442

*Primary Examiner*—William R. Dixon, Jr.
*Assistant Examiner*—Steven Capella
*Attorney, Agent, or Firm*—Armstrong, Nikaido, Marmelstein & Kubovcik

[57] ABSTRACT

Calcium carbide is prepared from a powdered lime material. The powdered lime material, possibly together with a reducing agent, is injected with the aid of a carrier gas into a plasma gas generated by a plasma generator. The heated lime material, together with any reducing agent used and the energy-rich plasma gas, is then introduced into a reaction chamber substantially surrounded on all sides by a solid reducing agent in piece form. When the lime material consists of quicklime, this is melted and reduced to liquid carbide and when the lime material consists of powdered limestone, it is burnt directly in the reaction zone to form liquid carbide.

9 Claims, No Drawings

METHOD OF MANUFACTURING CALCIUM CARBIDE FROM POWDERED LIME AND/OR LIMESTONE

BACKGROUND TO THE INVENTION

The present invention relates to a method of manufacturing calcium carbide from powdered lime/limestone.

Calcium carbide has been manufactured since the turn of the century and has been used as raw material in the heavy chemical industry for a long time, e.g. for producing lime nitrogen and PVC. The significance of carbide as a chemical raw material has decreased but it is used to a great extent in the production of acetylene gas for the engineering and shipbuilding industries. Over the last couple of decades more and more carbide is being used in the iron and steel industry for desulphurization purposes.

Calcium carbide is manufactured in electric arc furnaces, primarily closed furnaces equipped with Söderberg electrodes. Burnt lime, coke and anthracite are used as raw materials. The raw materials must have a certain particle size (ca. 5-40 mm) to give the correct porosity in the bed and correct electrical conditions in the charge. The raw materials must therefore first be screened, after which the fine portion obtained can be introduced to a certain extent in the furnace via a cellular electrode system. The operating temperature in the furance is ca. 2000° C. The carbide is tapped off into pans and allowed to solidify before being crushed, screened and packed. The technical carbide contains ca. 78% $CaC_2$, 15% $CaO$ and some other oxides deriving from the lime and carbon material.

The energy consumption is about 3500 kWh per ton technical carbide, calculated as furnace energy. To this must be added about 300 kWh per ton in the form of auxiliary energy.

A big drawback with this known process is that the raw material must be in piece form, thus limiting the materials available. Fine grained lime/limestone and carbon materials are generally considerably cheaper than material in piece form.

The electric arc furnace method is also sensitive to the electrical properties of the raw materials, and this may also limit the choice. It is therefore a matter of importance to find a process which is insensitive to the choice of raw materials and where the raw materials are dissociated from the electrical conductivity of the furnace charge.

SUMMARY OF THE INVENTION

The object of the present invention is to eliminate the drawbacks mentioned above and achieve a process permitting the manufacture of calcium carbide in a single step using raw materials in powder form. The process also enables carbide to be produced directly from fine grained limestone ($CaCO_3$), the limestone being burnt directly in the reaction zone, to form lime.

The present invention provides a method for the production of calcium carbide comprising introducing powdered lime/limestone and carbon powder, optionally together with a reducing agent, with the aid of a carrier gas into a plasma gas generated by a plasma generator, after which the heated lime/limestone, together with any reducing agent used and the energy-rich plasma gas, is introduced into a reaction chamber substantially surrounded on all sides by a solid reducing agent in piece form.

In the method of the invention the lime is melted and reduced to liquid carbide. When limestone is used as a reactant, the limestone is burnt directly in the reaction zone, whereupon the following reactions take place:

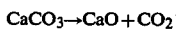

$CaCO_3 \rightarrow CaO + CO_2$

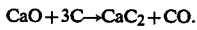

$CaO + 3C \rightarrow CaC_2 + CO$.

DETAILED DESCRIPTION OF THE INVENTION

The use of powdered materials proposed according to the invention facilitates the choice of carbide raw materials and less expensive materials can therefore be selected. The process suggested according to the invention is also insensitive to the electric properties of the raw material, thus facilitating the choice of reducing agent.

The reducing agent injected may be hydrocarbon such as natural gas, coal powder, charcoal powder, anthracite, petroleum coke, which may be purified, and/or coke breeze.

The temperature required for the process can easily be controlled by adjusting the quantity of electric energy supplied per unit of plasma gas in order to achieve optimum conditions for the least possible energy consumption.

Since the limestone is "burnt" directly in the reaction zone, no lime kiln is required and a considerable saving in energy is achieved since the burnt lime is converted directly to carbide without having been cooled first and then heated to reaction temperature.

According to a preferred embodiment of the invention the solid reducing agent in piece form is supplied continuously to the reaction zone at the rate at which it is consumed.

Coke, charcoal, petroleum coke and/or carbon black are suitable as reducing agent in piece form and the plasma gas used in the process suitably consists of process gas recirculated from the reaction zone.

The reducing agent in piece form may consist of a powder converted to piece form with the aid of a binder composed of C and H and possibly also O, e.g. sucrose.

According to another embodiment of the invention, the plasma generator used consists of an inductive plasma generator so that impurities from the electrodes are reduced to a minimum.

The method according to the invention may be used with advantage for manufacturing technical carbide with high gas content, in which case extremely pure lime/limestone and reducing agent with very low impurity contents are used as raw materials.

The invention will be further described in the following with reference to the following Examples. The reactions are preferably performed in a reactor similar to a shaft furnace, which is continuously charged from the top with a solid reducing agent through a blast furnace top having uniformly distributed, closed feed channels or an annular feed channel near the periphery of the shaft.

The powdered calcareous material is blown in at the bottom of the reactor through tuyeres with the aid of an inert or reducing gas. Hydrocarbon and possibly even oxygen gas may be blown in at the same time, preferably through the same tuyeres.

In the lower part of the shaft filled with reducing agent in piece form is a reaction chamber, surrounded on all sides by said piece formed reducing agent. The reduction of CaO and the melting takes place instantaneously in this reduction zone, as does the burning of limestone to lime when limestone is used as Ca carrier.

The reactor gas leaving, consisting of a mixture of carbon monoxide and hydrogen in high concentration, can be recirculated and used to generate the plasma gas and as carrier gas for feeding in the material in powder form.

An account of two experiments performed is given below to further illustrate the invention.

EXAMPLE 1

An experiment was performed on half-scale. Fine grained burnt lime having a particle size less than 2 mm was used as lime raw material. The "reaction chamber" consisted of coke. Coal powder was used as reducing agent and washed reduction gas consisting of CO and $H_2$ was used as carrier gas and plasma gas.

The electric power supplied was 1000 kW. 4 kg CaO/min was fed in as raw material and as reducing agent 3 kg coal powder per minute and 0.4 kg coke per minute.

A total of ca. 500 kg technical carbide was produced during the experiment, having a $CaC_2$ content of 78%. The mean electricity consumption was ca. 4 kWh per kg carbide produced.

The experiment was run on a small scale and the heat loss was therefore considerable. With gas recovery the electricity consumption can be reduced further and the heat losses are also far less in a larger plant.

EXAMPLE 2

An experiment was performed on half-scale. Fine grained limestone having a particle size less than 2 mm was used as lime raw material. The "reaction chamber" consisted of coke. Coal powder was used as reducing agent and washed reduction gas consisting of CO and $H_2$ was used as carrier gas and plasma gas.

The electric power supplied was 1000 kW. 4.5 kg CaO/min was fed in as raw material and as reducing agent 1.8 kg coal powder per minute and 0.4 kg coke per minute.

A total of ca. 500 kg technical carbide was produced during the experiment, having a $CaC_2$ content of 78%. The mean electricity consumption was ca. 6 kWh per kg carbide produced.

The experiment was run on a small scale and the heat loss was therefore considerable. With gas recovery the electricity consumption can be reduced further and the heat losses are also far less in a larger plant.

I claim:

1. A method for the production of calcium carbide comprising introducing powdered lime and/or limestone, optionally together with a reducing agent, with the aid of a carrier gas into a plasma gas generated by a plasma generator, after which the heated lime and/or limestone, together with any reducing agent used and the energy-rich plasma gas, is introduced into a reaction chamber substantially surrounded on all sides by a solid reducing agent in piece form, and thereby heating the lime and/or limestone directly in the reaction chamber, whereupon the following reactions $CaCO_3 \rightarrow CaO + CO_2$ and $CaO + 3C \rightarrow CaC_2 + CO$ take place with respect to any limestone introduced and the following reaction $CaO + 3C \rightarrow CaC_2 + CO$ takes place with respect to any lime introduced.

2. A method according to claim 1, wherein the lime consists of quicklime which is melted and reduced to liquid carbide.

3. A method according to claim 1, wherein a reducing agent is introduced with the powdered lime and/or limestone and is a hydrocarbon.

4. A method according to claim 1, wherein the solid reducing agent in piece form is supplied continuously to the reaction zone at the rate at which it is consumed.

5. A method according to claim 1, wherein the reducing agent in piece form consists of a powder converted to piece form by means of a binder composed of C and H.

6. A method according to claim 1, wherein the plasma gas consists of process gas recirculated from the reaction zone.

7. A method according to claim 1, wherein the plasma generator consists of an inductive plasma generator to reduce impurities from electrodes of the generator to a minimum.

8. A method according to claim 1, wherein technical carbide with high gas content is produced using extremely pure lime and a reducing agent with very low impurity content as raw materials.

9. A method according to claim 5, wherein said binder is also composed of O.

* * * * *